United States Patent
Chanoux

[19]
[11] Patent Number: 6,049,888
[45] Date of Patent: Apr. 11, 2000

[54] METHOD AND APPARATUS FOR AUTOMATIC COMMUNICATION CONFIGURATION

[75] Inventor: David Chanoux, Lexington, Mass.

[73] Assignee: Scanning Devices, Inc., Lexington, Mass.

[21] Appl. No.: 08/938,503

[22] Filed: Sep. 26, 1997

Related U.S. Application Data

[63] Continuation of application No. 08/610,301, Mar. 4, 1996, abandoned.

[51] Int. Cl.[7] .......................... H02H 3/05; H03K 19/003
[52] U.S. Cl. ...................... 714/4; 375/8; 375/7; 714/704
[58] Field of Search ................. 714/4, 6, 7, 704; 375/8, 7, 117, 121, 295, 316, 317, 355–357

[56] References Cited

U.S. PATENT DOCUMENTS

| | | | |
|---|---|---|---|
| 3,665,103 | 5/1972 | Watkins | 375/276 |
| 3,676,858 | 7/1972 | Finch et al. | 340/172.5 |
| 4,075,440 | 2/1978 | Laubengayer | 179/175.3 S |
| 4,107,459 | 8/1978 | Stamper | 178/69.1 |
| 4,270,202 | 5/1981 | Stuttard et al. | 370/80 |
| 4,307,265 | 12/1981 | Hagen et al. | 375/316 |
| 4,545,013 | 10/1985 | Lyon et al. | 364/200 |
| 4,635,275 | 1/1987 | Borg et al. | 375/8 |
| 4,663,766 | 5/1987 | Bremer | 375/13 |
| 4,761,800 | 8/1988 | Lese et al. | 375/117 |
| 4,788,657 | 11/1988 | Douglas et al. | 364/900 |
| 4,893,305 | 1/1990 | Fernandez et al. | 370/84 |
| 5,008,902 | 4/1991 | Key et al. | 375/10 |
| 5,014,344 | 5/1991 | Goldberg | 375/107 |
| 5,022,050 | 6/1991 | Tanaka | 375/7 |
| 5,153,897 | 10/1992 | Sumiyoshi et al. | 375/8 |
| 5,208,831 | 5/1993 | Ueno et al. | 375/7 |
| 5,274,679 | 12/1993 | Abe et al. | 375/117 |
| 5,297,186 | 3/1994 | Dong | 375/121 |
| 5,452,415 | 9/1995 | Hotka | 395/161 |
| 5,541,955 | 7/1996 | Jacobsmeyer | 375/222 |
| 5,566,206 | 10/1996 | Butler et al. | 375/225 |
| 5,774,496 | 6/1998 | Butler et al. | 375/225 |

OTHER PUBLICATIONS

"Model 77/232 Serial Input Numeric 3" Display Users Manual," Vorne Industries, pp. 1–12.

"Model EMD "Big Board" Scoreboards," SAI Data Sheet, Systems Associates, Inc., pp. 1–2, 1993.

"EL233 Flip Digit Display," Rice Lake Weighing Systems, pp. 1–2, 1993.

"IR Series," MATKO, one page.

Campbell, J., "C Programmer's Guide to Serial Communications," SAMS, cover sheet and p. 166, 1987.

*Primary Examiner*—Dieu-Minh T. Le
*Attorney, Agent, or Firm*—Hamilton Brook Smith & Reynolds, PC

[57] ABSTRACT

A method and apparatus is provided for automatically determining the asynchronous serial data communication characteristics of a transmitting device and automatically configuring a receiving device with these characteristics. The method of determining the data communication characteristics can be initiated on demand with the results of the determination stored in non-volatile memory for continual, repetitive use by the receiving device.

26 Claims, 7 Drawing Sheets

METHOD AND APPARATUS FOR AUTOMATIC COMMUNICATION CONFIGURATION

This application is a continuation of application Ser. No. 08/610,301, filed on Mar. 4, 1996, now abandoned, which is incorporated herein by reference in its entirety.

BACKGROUND OF THE INVENTION

Asynchronous serial data communication has long been used to transmit data measured or generated at one device to another device for processing, storage or display. Multiple standards exist for specifying the transmission characteristics, or line settings, of serial data communication. Such characteristics include electrical form, data rate, data formats, error checking protocols and control mechanisms. In order to achieve proper data communication between a transmitting device and a receiving device, each device must use the same characteristics.

As a result, transmitting and receiving devices are often manufactured to accommodate multiple standards, thereby providing flexibility to allow a specific device to be set to operate under varying conditions with many different independent transmitting and receiving devices. In operation, the receiving device must be set to match the specific serial data communication characteristics in use by the transmitting device. Selection from the range of available options is customarily made by a user or installer at the receiver who has been advised in advance of the standard being employed by the transmitter. The user selects the options for the receiver by setting switches or jumpers, entering commands from a keyboard, or using a software program which mimics keyboard commands.

Thus, the flexibility to select and set serial data communication characteristics of one receiving device usually requires that the user or installer know the transmission characteristics used by the transmitting device and know how to set these characteristics in the receiving device.

Often, the asynchronous serial data communication characteristics are not known or easily determined, making installation and setup difficult, risking incorrect data communication. Setup varies from device to device, adding to the difficulty in making the receiving device operational with the correct characteristics. If the settings specifying the asynchronous serial data communication characteristics are not correct, the receiving device is not able to receive data properly.

SUMMARY OF THE INVENTION

The present invention overcomes the foregoing problems associated with manual setup by automatically determining the data communication characteristics of asynchronous signals received from a transmitting device and modifying a receiving device to match the characteristics of the transmitting device. This allows the receiving device to be used with a variety of different transmitting devices without requiring manual setup of the data communication characteristics in the receiving device.

Accordingly, a method of determining data communication characteristics of asynchronous data signals sent by a transmitting device to a receiving device comprises the steps of receiving asynchronous data signals sent from the transmitting device; measuring an interval between succeeding data signal transitions to determine the data rate of the received data signals; and detecting framing errors in the received data signals to determine the data format of the received data signals. The data rate is determined from the shortest measured interval between data signal transitions. The data format is determined by iteratively programming a number of bits per data character in the receiving device until detected framing errors are below an error threshold.

According to one aspect of the invention, the method further includes automatically configuring the receiving device with the data rate and data format to match the data communication characteristics of the transmitting device.

According to another aspect of the invention, the method further includes detecting parity errors for a sequence of data in the received data signals and setting parity according to the level of parity errors detected in the sequence of data.

In a preferred embodiment, a receiving device comprises a programmable receiver for receiving asynchronous data signals from a transmitting device and a microcontroller coupled to the receiver programmed to perform the steps: (i) measuring the interval between succeeding received data signal transitions to determine the data rate of the data signals; detecting framing errors in the data signals to determine the data format of the received data signals; and configuring the receiving device with the detected data rate and data format to match the data communication characteristics of the transmitting device. The receiving device further includes a detector circuit for detecting the electrical form and polarity of the received data signals, a memory for storing data rate and data format characteristics and a display responsive to data signals from the microcontroller.

BRIEF DESCRIPTION OF THE DRAWINGS

The above and other features of the invention including various novel details of construction and combinations of parts will now be more particularly described with reference to the accompanying drawings and pointed out in the claims. It will be understood that the particular apparatus embodying the invention is shown by way of illustration only and not as a limitation of the invention. The principles and features of this invention may be employed in varied and numerous embodiments without departing from the scope of the invention.

DETAILED DESCRIPTION OF THE INVENTION

Figure 1:
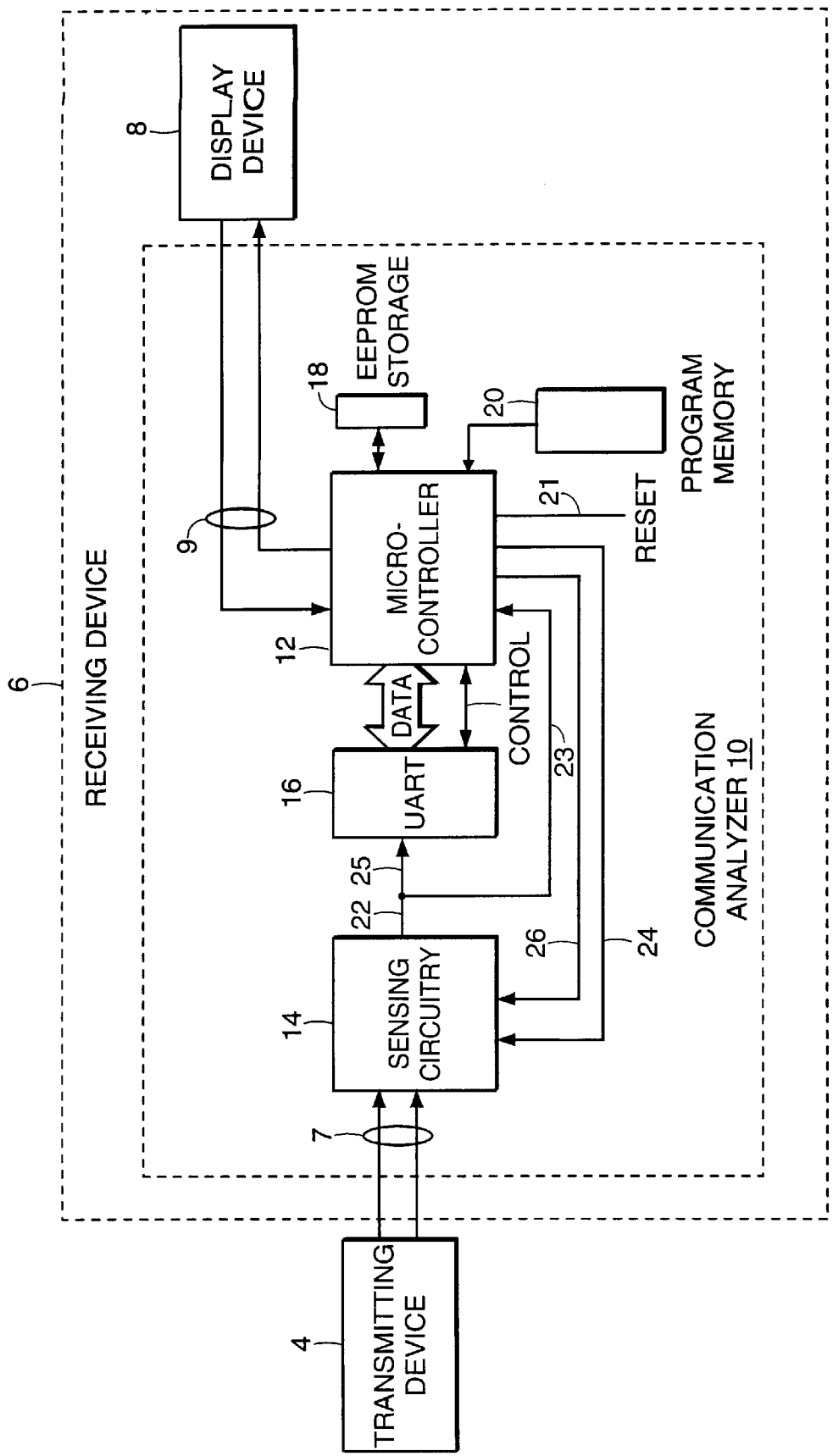
FIG. 1 is a block diagram of a system including the communication analyzer 10 of the present invention.

FIG. 1 shows a communication system of the present invention in which a transmitting device 4, such as a measurement or counting device, is coupled to a receiving device 6, such as a digital display, over a communication link 7. The receiving device 6 includes a communication analyzer 10 for analyzing asynchronous data signals received from transmitting device 4 and a display device 8 for visually displaying the communicated information or data. The asynchronous serial data communication characteristics of the transmitting device 4 can be determined automatically by examining serial data signals received at the analyzer 10 from transmitting device 4. The analyzer 10 can then automatically configure the receiving device 6 to match such characteristics, thereby obviating the need for a priori knowledge of the asynchronous serial data communication characteristics of the transmitting device by the user or installer.

To determine the proper serial data communication setup, in general, four physical and logical characteristics of the transmitted data signals must be detected and determined by the analyzer 10: electrical form and polarity, data rate, data format, and parity. The characteristics of data rate, data format, and parity are also referred to as line settings.

Asynchronous serial data communication signals take the form of electrical signals delivered via two electrical conductors. The electrical signals may be either of voltage type or current type. Voltage type signals are characterized by the electrical potential between the two conductors when they are in the open circuit (not connected) state, defined by industry standards, such as, RS-232, RS-422, RS-485, Electronic Industries Association (EIA) standards and other de-facto standards. Electrical current type signals are characterized by the electric current flowing in the conductors when they are in the closed circuit (connected) state, defined by the de-facto standard for 20 milliamp (ma) current loop transmission.

Data rate refers to the transmission rate of bits in the transmitted data signal with standard rates typically ranging from 300 bits per second (bps) to 19,200 bps. Data format defines the makeup of the serial data which typically comprises a start bit, a number of data bits, a number of stop bits per character and an optional parity check bit. Parity is a technique for error detection implemented by the addition of one data bit to the character data. Parity may be set for "EVEN", "ODD" or "NONE". In the ODD parity case, a parity bit is added to the data bits and set so that the serial data character contains an odd number of "1" bits. In the EVEN parity case, a parity bit is added to the data bits and set so that the serial data character contains an even number of "1" bits. In the NONE parity case, no additional bits are added.

The analyzer 10 includes a microcontroller 12, sensing circuitry 14, a Universal Asynchronous Receiver/Transmitter (UART) 16, a nonvolatile electronic memory EEPROM 18, and a program memory 20. In general, the analyzer 10 operates by receiving asynchronous data signals transmitted by transmitting device 4 on communication link 7 coupled to sensing circuitry 14. The sensing circuitry 14, under program control from the microcontroller 12 on lines 24 and 26, detects the electrical form and polarity of the received data signals. The sensing circuitry 14 is coupled to the microcontroller 12 via line 23 and to the input 25 of the UART 16. The UART 16 converts data received from the transmitter 4 in serial form to parallel form according to the line settings with which it has been programmed by the microcontroller 12 and passes the parallel data to the microcontroller for processing.

The correct electrical form and polarity are sensed by the microcontroller 12 from the output 22 of sensing circuitry 14. The microcontroller 12 detects the data rate directly by timing the received data signals coupled through sensing circuitry 14 on line 23 and sets the UART 16 accordingly. The microcontroller 12 is further programmed to control and monitor the UART 16 to determine data format and parity characteristics. Knowing the correct data communication characteristics, the microcontroller 12 passes data signals from the UART 16 to display device 8 on a parallel communication bus 9. These features of the invention will now be described in more detail in connection with FIGS. 2–8.

1. Electrical Form and Polarity

Figure 2:
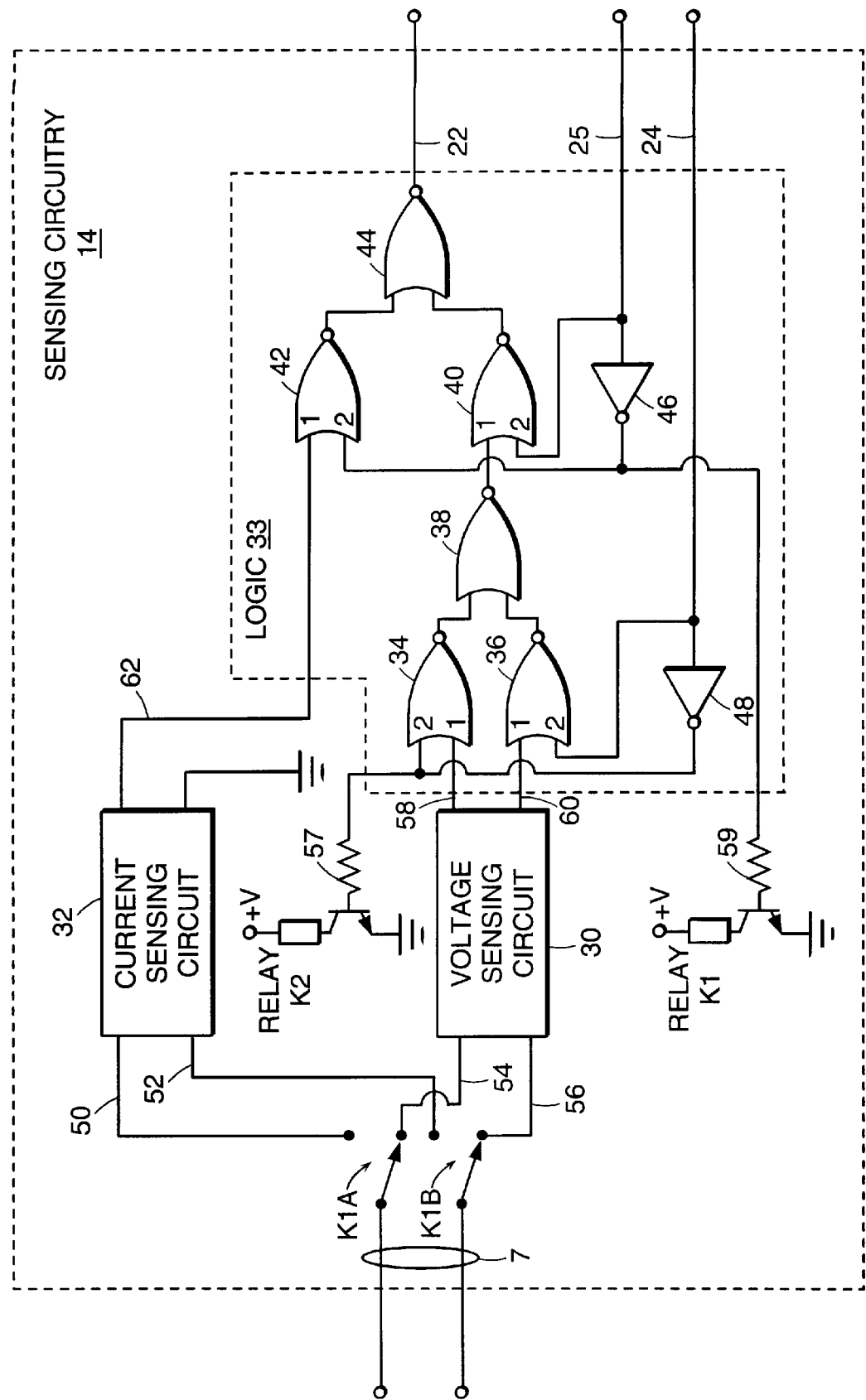
FIG. 2 is a schematic block diagram of the sensing circuitry 14 of FIG. 1.
Figure 3:
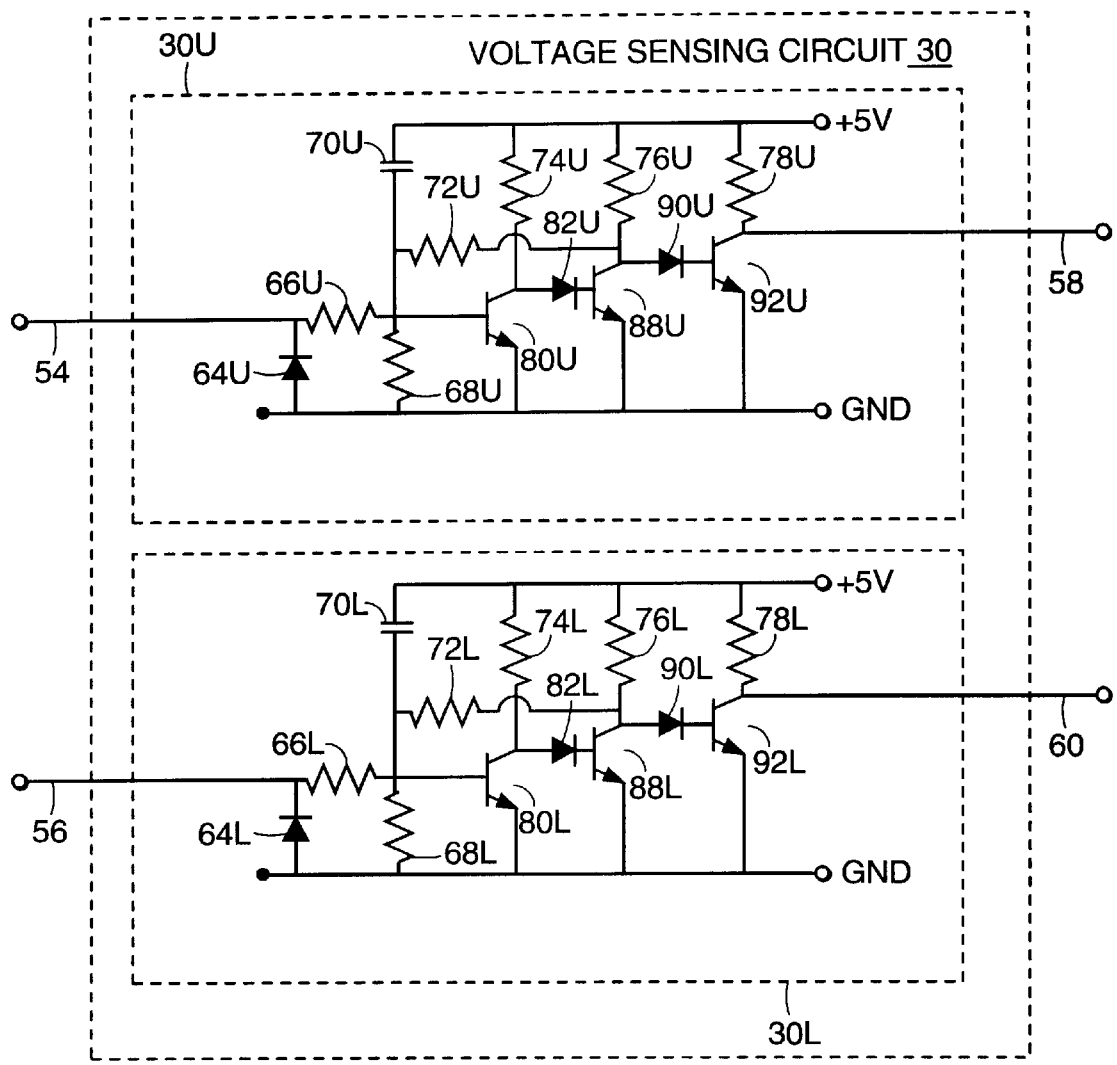
FIG. 3 is a schematic circuit diagram of the voltage sensing circuit 30 of FIG. 2.
Figure 4:
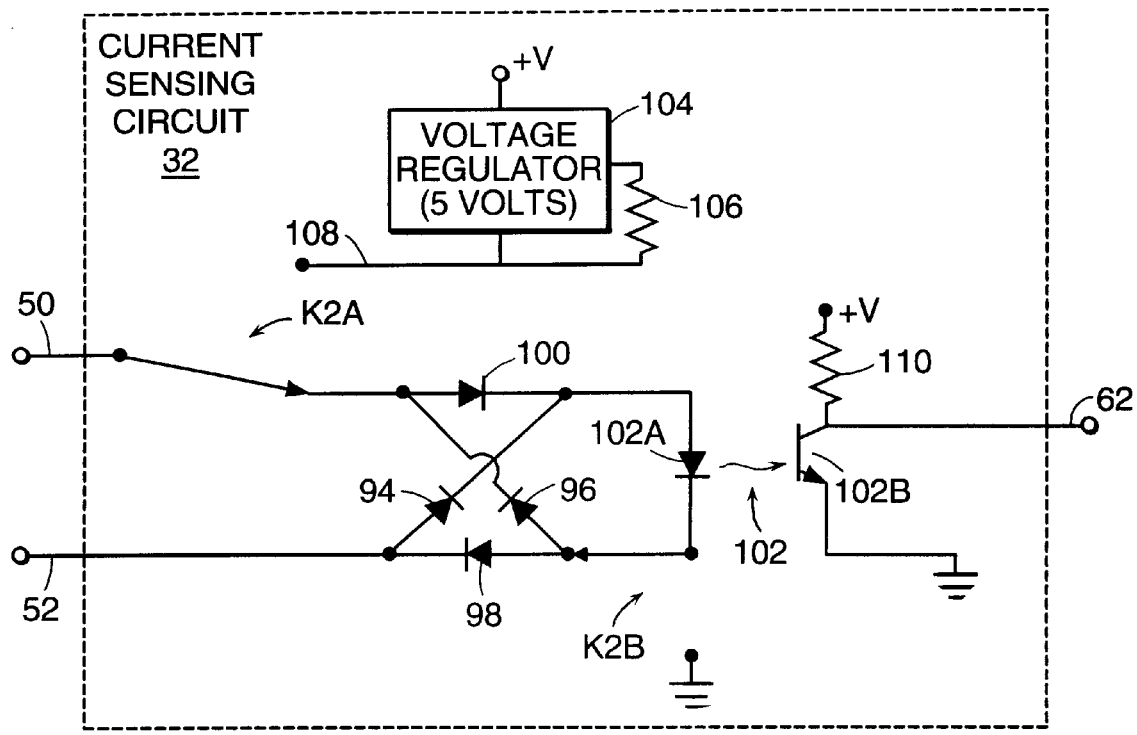
FIG. 4 is a schematic circuit diagram of the current sensing circuit 32 of FIG. 2.

To determine which type of electrical signal is being transmitted, the analyzer 10 includes voltage and current sensing circuitry 14 shown in FIGS. 2 to 4. Referring now to FIG. 2, sensing circuitry 14 comprises both a voltage sensing circuit 30 and a current sensing circuit 32, each of which is described further below. Signal routing logic 33 coupled to the outputs of sensing circuits 30 and 32 together with control lines 24 and 26 permits voltage and current sensing in such a manner that it does not interfere with the reception of data signals. In order to prevent the sensing from affecting the serial data communication signals, the data signal received on link 7 is alternately delivered to one sensing circuit and then the other. Dual contacts K1A and K1B of relay K1 alternately connect the input data signals received on link 7 to terminals 50, 52 of current sensing circuit 32 and to terminals 54, 56 of voltage sensing circuit 30. A relay coil K1 controlled by microcontroller 12 (FIG. 1) on control line 26 switches the positioning of dual contacts K1A and K1B. Routing logic 33 selects the output of whichever sensing circuit is receiving the serial data signal and routes it to the microcontroller 12 for detection of the form of the serial data communication signal.

The microcontroller 12 initially sets control lines 24 and 26 according to an assumed electrical form and polarity, as described further below with respect to the flow diagram of FIG. 6. The following table indicates the assumed electrical status as follows:

| Control Line 24 | Control Line 26 | Logic Output 22 Equal to Sensing Circuit Output | Sensing Circuit Employed to Detect Electrical Form Routed to Logic Output 22 |
| --- | --- | --- | --- |
| 0 | 1 | line 62 | passive current type |
| 0 | 0 | line 60 | voltage type/ negative polarity |
| 1 | 1 | line 62 | active current type |
| 1 | 0 | line 58 | voltage type/ positive polarity |

Routing logic 33 makes logic output 22 equal to one of three signals, line 58, 60 or 62 depending on the control lines 24 and 26 set by the microcontroller 12, and by means of NOR gates 34, 36, 38, 40, 42, 44 and inverters 46 and 48. Each first terminal of NOR gates 34 and 36 is coupled to outputs 58 and 60 respectively of voltage sensing circuit 30. The first terminal of NOR gate 42 is connected to output 62 of the current sensing circuit 32. Each second terminal of NOR gates 34, 36 and 40, 42 is connected to control line 24, control line 26 or their respective inverse established by inverters 46 and 48. Control line 24 from microcontroller 12 is used to select voltage and polarity based on outputs 58 and 60, and further serves to de-energize relay coil K2 for selecting the current transmitter type (described further below).

Control line 26 from microcontroller 12 is used to select the output 62 of the current sensing circuit 32 and further serves to de-energize relay coil K1 to switch the serial data signal 7 to the current sensing circuit 32 from the voltage sensing circuit 30. The outputs of NOR gates 40 and 42 are gated through NOR gate 44 to provide output 22 to microcontroller 12 and UART 16 (FIG. 1).

The microcontroller 12 can be, for example, a model 80C451 microcontroller manufactured by Signetics. The UART 16 can be, for example, a model SCC2691 UART available from Signetics.

For serial data communication signals of the voltage form, the "no-data" or idle condition is defined as negative voltage polarity between the two conductors of data link 7. Data transmission reverses the voltage relationship between the two conductors to positive. The voltage sensing circuit 30 in FIG. 3 is used to detect changes in voltage representing data presented at inputs 54 and 56 when dual contacts K1A and K1B are in the closed position. If the polarity of the voltage changes, representing data at inputs 54 and 56, the voltage change is transferred to outputs 58 and 60 relative to signal ground. Switching detected at outputs 58 and 60 indicates that the data signal is of the voltage form.

The voltage sensing circuit 30 uses a high impedance input to approximate an open circuit so that the sensing does not affect the characteristic being detected.

The operation of voltage sensing circuit 30 will now be described. The voltage sensing circuit 30 detects signals of the voltage form, and converts signals of the voltage form from communication levels (typically +12 Volts and −12 Volts) to logic levels of +5 Volts and signal ground. The voltage sensing circuit 30 identifies signals having either polarity.

Data signals received on link 7 are applied at points 54 and 56 via dual contacts K1A, K1B when input relay K1 is energized by control line 26. If the data signal at 54 is positive relative to line 56, the signal is sensed through upper sensing circuit 30U.

In the upper voltage sensing circuit 30U, the applied voltage at 54 is divided by resistors 66U and 68U and applied to the base of transistor 80U to saturate the transistor. In this state, the transistor 80U acts as a closed switch, connecting resistor 74U and series diode 82U to signal ground. This diverts current flowing through resistor 74U away from transistor 88U, causing transistor 88U to be cut-off, acting as an open switch. With transistor 88U cut-off, resistor 76U and diode 90U connect the base of transistor 92U to the +5 Volt supply, saturating transistor 92U and causing transistor 92U to act as a closed switch. The closed switch state of transistor 92U draws current through resistor 78U and sets output point 58 at logical "0", correctly representing the data signal presented at the input 54. Capacitor 70U and series resistor 72U provide switching hysteresis to exclude signal noise from the output and ensure clean switching.

Diode 64L provides the return signal path through the lower sensing circuit 30L, keeping transistor 80L cut-off. In this state, transistor 80L acts as an open switch. Resistor 74L and series diode 82L then connect the base of transistor 88L to the +5 volt supply, saturating transistor 88L. Transistor 88L acts as a closed switch, diverting current flowing through resistor 76L away from transistor 92L to signal ground. With no base current, transistor 92L acts as an open switch. The open switch state of transistor 92L sets output point 60 equal to logical "1", representing the inverse of the applied data signal. Capacitor 70L and series resistor 72L provide switching hysteresis to exclude signal noise from the output and ensure clean switching.

When the polarity of the input signals received across lines 54, 56 is reversed, as would be the case with a data signal of the voltage form, the state of the upper and lower circuits reverse, causing the outputs at both 58 and 60 to switch. Thus, the output at 58 is always the inverse logical state of the output at 60.

In general, data signals of the current form alternate between 20 milliamps (current flowing) and zero (no current). If a 20 milliamp signal is applied to the voltage sensing circuit 30 at points 54 and 56, one output (either 58 or 60, depending on the polarity of the current) will be logical "0" and the other will be logical "1" as described above. However, when the current is switched to zero, as would be the case if the data signal were of the current form, both outputs 58 and 60 become equal to logical "1". This difference allows the microcontroller 12 to distinguish between data signals of the voltage and current form.

For serial data communication signals of the current form, the "no-data" or idle condition is defined as a current approximately equal to 20 ma flowing in the two conductors when the conductors are in the closed circuit (connected) state. Data transmission by transmitting device 4 (FIG. 1) switches the current to zero.

The current sensing circuit 32 in FIG. 4 is used to detect changes in current representing data produced by a transmitting device whether of active or passive type. Relay K1 is de-energized such that dual contacts, K1A, K1B connect the input on link 7 to lines 50, 52. Relay coil K2 controlled by control line 24 (FIG. 1) selects between active or passive transmitter type. When the active type is selected, relay K2 is not energized and contacts K2A and K2B are in the normally closed state as shown in FIG. 4. When relay coil K2 is energized to select the passive type, contact K2B connects the cathode terminal of diode 102A to signal ground and contact K2A connects input 50 to line 108.

In the active detection mode, the serial data signal is delivered to inputs 50 and 52. The serial data current signal flows through a bridge rectifier comprising diodes 94, 96, 98 and 100 and is delivered with proper polarity to a light-emitting diode input of an optical isolator 102. When sufficient current flows through the light-emitting diode 102A, it generates light for detection at the phototransistor 102B of the optical isolator 102. When serial data is delivered to inputs 50 and 52, the current is switched to zero, light in the optical isolator 102 is extinguished and the phototransistor 102B switches, transferring the signal to line 62.

The current sensing circuit 32 also detects the presence of data for a passive transmitter type. The combination of voltage regulator 104 and series resistor 106 yields a 20 milliamp current source that delivers current to input 50 when relay K2 is energized by control line 24 (FIG. 2) to connect to line 108. The passive transmitter is thus connected to inputs 50 and 52, wherein again switched current is the means of transmitting serial data. When sufficient current flows through the light-emitting diode 102A, it generates light for detection at the phototransistor side 102B of the optical isolator 102. When serial data is delivered to inputs 50 and 52 by the passive transmitter switching action, the current is switched to zero, light in the optical isolator 102 is extinguished and the phototransistor 102B switches, transferring the signal to line 62.

For both active and passive transmitters, line 62 is connected, via routing logic 33 described above (FIG. 2) to microcontroller 12 which is programmed to detect switching of serial data in the current form at inputs 50 and 52 of current sensing circuit 32.

The current sensing circuit 32 uses a low impedance input to approximate a closed circuit so that the sensing does not affect the characteristic being measured. If the serial data communication signal presented at inputs 50 and 52 is in the voltage form, the closed circuit nature of the current sensing circuit 32 and the bi-polar action of the bridge rectifier prevents switching at output line 62.

When the microcontroller 12 detects switching at line 22 (FIG. 2), it records the form of the serial data communication signal (voltage or current), polarity, and active/passive status based on the state of control lines 24 and 26. If the data signal has been routed through the voltage sensing circuit 30, the serial data communication is of the voltage form. If the signal has been routed through the current sensing circuit 32, serial data communication is of the current form. Likewise, if relay coil K2 is energized, the signal is of inverted polarity or passive current transmitter. If relay coil K2 is de-energized, the signal is of positive polarity or active current transmitter.

Figure 6:
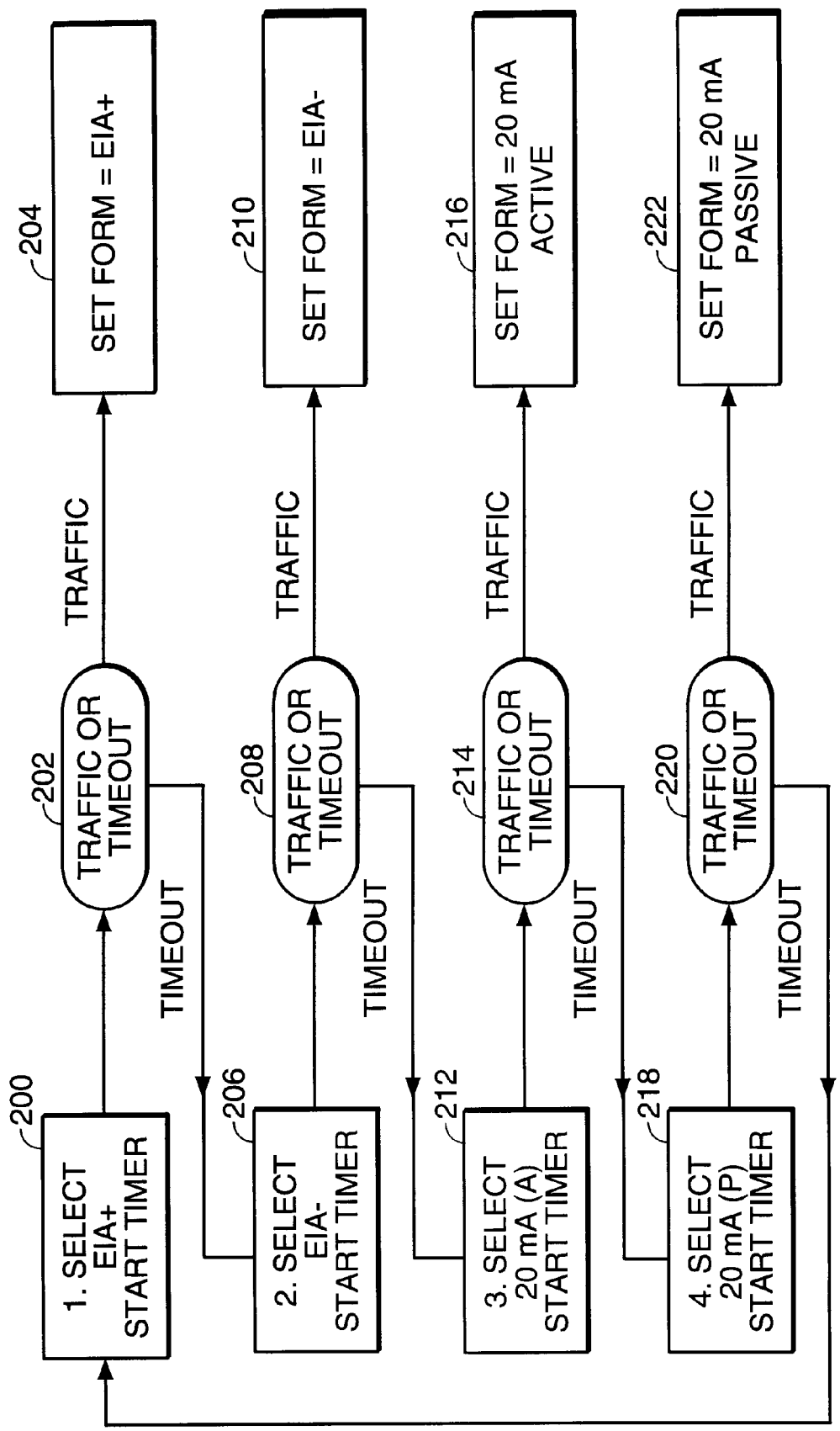
FIG. 6 is a flow diagram of the method for determining signal form and polarity of the present invention.
Figure 7:
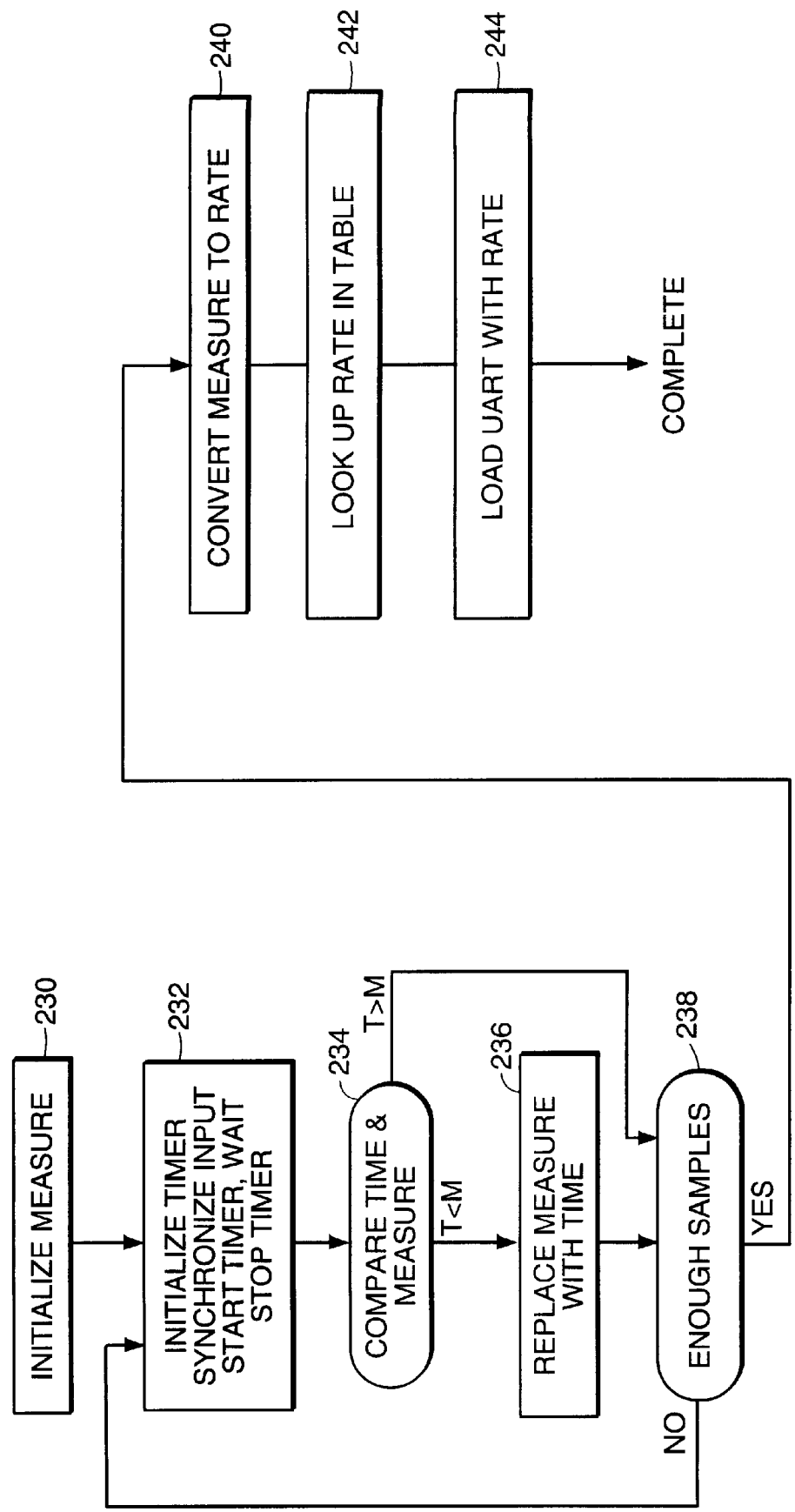
FIG. 7 is a flow diagram of the method for determining data rate of the present invention.
Figure 8:
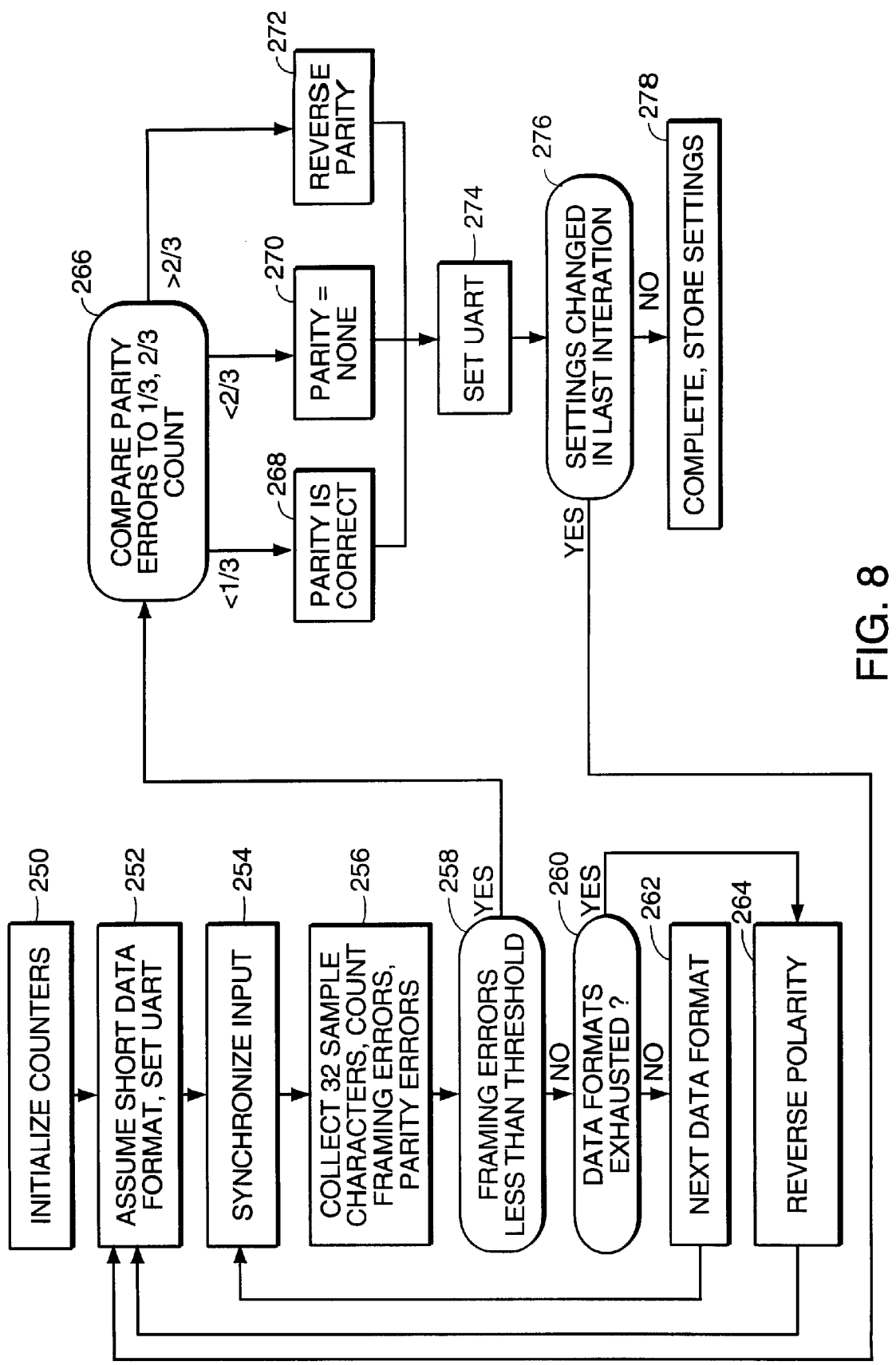
FIG. 8 is a flow diagram of the method for determining data format and polarity of the present invention.

Referring now to FIG. 6, a flow diagram is shown for the method by which the microcontroller 12 is programmed to detect signal form using the sensing circuitry 14 (FIG. 1). At step 200, voltage form with positive polarity (EIA+) is initially assumed and a timer is set in microcontroller 12. Control lines 24 and 26 are set to logic level "1" and "0" respectively such that relays K1 and K2 are de-energized and energized respectively. At step 202, if data traffic has been detected, then the electrical form is set as EIA+ at step 204. If no traffic is detected, then a voltage form with negative polarity (EIA−) is assumed at step 206. Control line 24 is now set to logic level "0" which energizes relay K2 and selects NOR gate 36. If traffic is detected with this assumed form at 208, then at step 210 the electrical form is set as EIA−.

If no traffic is detected at step 208, then at step 212 active current form is assumed. Control line 24 is set to logic level "1" to de-energize relay K2 and control line 26 is set to logic level "1" to de-energize relay K1. If traffic is detected at step 214 then at step 216 the electrical form is set to 20 mA active. If no traffic is detected at step 214, then passive current form is assumed at step 218. Control lines 24 and 26 are set to logic level "0" and "1" respectively to energize relay K1 and de-energize relay K2. For traffic detected at step 220, the electrical form is set to 20 mA passive at step 222. If no traffic is detected at step 220, then the cycle begins again at step 200.

After this detection has been made, the microcontroller 12 sets the signal routing using control lines 24 and 26 so that the serial data communication signal received on line 7 is connected to the sensing circuit appropriate for its detected form.

2. Data Rate

Figure 5:
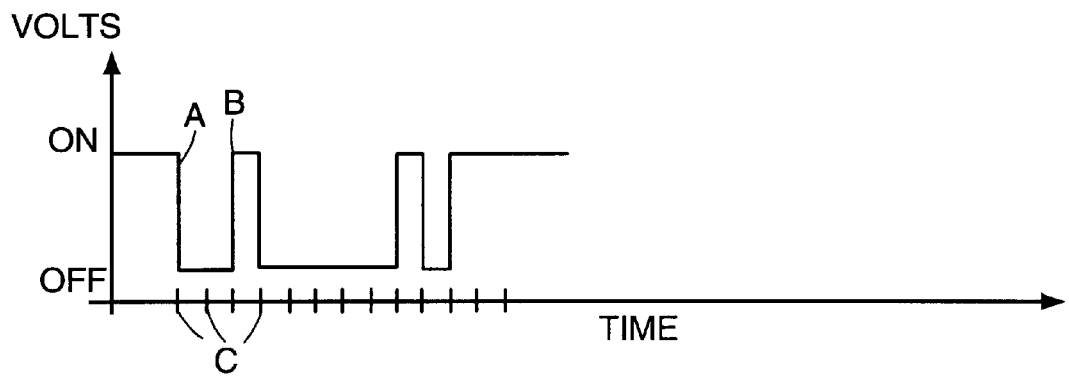
FIG. 5 is a voltage versus time diagram illustrating an asynchronous data signal representing ASCII character A.

The data rate at which data is transmitted may be determine by measuring the time interval of the shortest data element, a single data bit. A data signal as a function of time is illustrated in FIG. 5 as a series of ON and OFF intervals with signal transitions (e.g., A and B) for specific time intervals. This data signal is received on link 7 (FIG. 1). The microcontroller 12, receiving the serial data at input 23 (FIG. 1), has the capability of measuring time by counting its internal clock which operates at a known rate that is higher than the range of data rates to be measured. The tick marks C on the time axis indicate the clock cycles of the internal clock.

The microcontroller 12 is programmed to measure the shortest interval during a sequence of serial data signals. Measurement is made by timing, comparing and storing with the objective of storing the shortest time interval in a sequence of received data as shown in the flow diagram of FIG. 7. Timing begins at step 232 on a falling data transition such as point A (FIG. 5) and ends at the next rising data transition such as point B (FIG. 5) at step 232. Each interval is measured and the resulting measurement is compared to the previously recorded shortest interval at step 234. If the current measured interval is less than the previous shortest interval, it replaces the previous shortest interval in storage at step 236.

Success in relating the shortest measurement interval to the data rate depends on receiving at least one data element made up of at least one data bit both preceded and followed by a data bit of the opposite state; i.e., a "1" preceded and followed by a "0" or a "0" preceded and followed by a "1". This condition presents the shortest interval. For serial data in the ASCII format, approximately 50% of all data characters satisfy this condition. For example, ASCII characters commonly used for line control such as STX (Start of Text), LF (Line Feed) and CR (Carriage Return) satisfy this condition. It should be noted that data rate detection does not depend on receiving any particular predefined or training character as the first character received. Rather, the approach of the present invention operates on a statistically significant series of varying data characters.

Measuring, comparing and storing the shortest interval over an increasing number of serial data communication characters increases the likelihood that the shortest interval will have been detected, assuming that the serial data contains some variation in content. At step 238, the number of data element samples already measured is compared with a predetermined level of samples.

Practical experience with the apparatus 10 of the present invention shows that examining 50 consecutive serial data characters yields correct data rate detection in all cases except the degenerate case where the transmission consists of only the character 0 (the "break" character). Transmissions with varying character content is correctly detected within 50 characters by the approach of the present invention.

Once the shortest interval has been detected for enough samples at step 238, the data rate is derived at step 240 according to the formula:

Date Rate=1/Shortest Interval Measured

The result of this calculation yields a rate in bits per second. The microcontroller 12 is programmed at step 242 to select the data rate from a lookup table of standard rates based on the calculated rate. The standard data rates include, but are not limited to, 300 bps, 1200 bps, 2400 bps, 4800 bps, 9600 bps, and 19,200 bps.

Once the data rate has been determined, the UART 16 is loaded with the data rate and can begin operation receiving serial data on line 25. The UART 16 performs serial-to-parallel data conversion of incoming serial data and makes it available to microcontroller 12. It also detects and reports error conditions such as overrun, framing, parity or break. The approach to the next level of detection, data format, is to minimize errors detected by the UART 16.

3. Data Format

Both transmitting and receiving devices must be using the same data format. Referring now to the flow diagram of FIG. 8, the data format is determined by selective trial and error, using the number of bits per character and, if the signal is of the voltage form, the polarity of the signal as variables. A data format is assumed at step 252 beginning with the smallest number of bits per character and then the UART 16 is monitored to identify data overrun and framing errors.

The microcontroller 12 is programmed to initially program the UART 16 with the minimum number of bits per serial data character (typically 6). If the actual serial data format of the received data signals contains more than this programmed number of bits per character, the UART 16 will detect overruns and report framing errors to the microcontroller 12.

After initially setting the UART at step 252, the microcontroller 12 is programmed to accept a statistically significant number of serial data characters and count the number of framing errors at step 256. If the number of errors at step 258 is greater than the number expected, and the range of data formats at step 260 has not been exhausted, then the microcontroller 12 is programmed to increase the number of data bits for the next format at step 262. This process continues until the framing errors are reduced or eliminated. Elimination of framing errors occurs when the length of the serial data unit being transmitted is the same as the length of the serial data unit defined for the UART 16.

In the preferred embodiment, 32 characters are sampled for each data format. When data format of the UART 16 is not set consistently with the transmitter, framing errors are reported for more than 75% of the characters received. When data format is set consistent with the transmitter, framing errors are reported for less than 25% of the characters received. This measurement provides a statistically significant indication of correct or incorrect data format.

If the signal is of the voltage form and the correct data format cannot be determined after all data formats have been exhausted at 260, then the microcontroller is programmed to reverse polarity at step 264, directing the inverted signal to the input of the UART 16. For example, if line 58 (FIG. 2) had been selected, the microcontroller 12 changes the selection to line 60. The trial and error procedure is repeated with the inverted signal beginning at step 252.

If the signal is of the current form, polarity is assured by the action of the bridge rectifier of current sensing circuit 32 (FIG. 4). A current type data signal is delivered by the current sensing circuit 32 with the proper polarity even if the signal applied to inputs 50 and 52 is reversed.

4. Parity

In the present invention, parity is determined by selective trial and error using the UART 16 to report parity errors. When a serial data character is received, the UART 16 calculates a parity bit based on its setup and compares the calculated bit to the bit actually received. If they are not the same, a parity error is reported.

Referring again to FIG. 8, the UART 16 is set with an assumption of parity at step 252. Parity errors are counted and calculated as the percent of received data characters at step 256. The parity errors are compared to threshold levels at step 262. If parity errors are near 100% at step 268, the parity set in the UART 16 is opposite (if EVEN, should be ODD; if ODD, should be EVEN). If the parity errors are near 0%, the parity is correct at step 264. If the parity errors are near 50%, the correct parity setting is "NONE" at step 266.

After measuring a statistically significant number of serial data characters, the microcontroller 12 is programmed to set parity according to the results of the measurement at step 270. In the preferred embodiment, a measurement based on 32 characters produces satisfactory results.

Detection of parity completes the suite of asynchronous serial data communication characteristics which must be detected to specify the transmission. In addition, the stop bit length must be specified. Because the purpose of the stop bit is to provide sufficient delay time for the receiving device to process the received character and the required delay time is known by the communications analyzer to be less than 1, the stop bit length may be set at 1 for all possible data formats with acceptable results. The receiving device is automatically configured to match the transmitting device serial data communication characteristics, which can be stored in electrically erasable memory at step 274 without intervention or action by the user or installer. The asynchronous serial data characteristics, or line settings, in use are written to EEPROM 18 (FIG. 1) or other non-volatile memory in such a way that they can be recalled automatically.

The method of the present invention can be initiated on demand by the user or the installer so that a receiving device 6 can be used to communicate with different transmitting devices 4 using different serial data communication characteristics. This is referred to as a "learn" sequence. A reset line 21 (FIG. 1) is provided for the user to request initiation of the learn sequence procedure to characterize the asynchronous serial data transmissions and update the stored characteristics for further use. At the end of the learn sequence or on powerup, the line settings stored in EEPROM 18 are used by the microcontroller to program the UART 16 for receipt of serial data and to set control lines 24 and 26 to route serial data signals through the proper sensing circuitry.

The correctly received data signals are made available to the display device 8 over parallel data communication bus 9 from microcontroller 12. The display device 8 can be, for example, a segmented mechanical or electronic display.

Apparatus embodying the present invention are useful for automatically configuring receiving devices such as manufacturing production counters, production rate monitors, tachometers, barcode readers, and automatic identification devices. Other applicable receiving devices include weighing systems and indicators, and process measurement devices.

EQUIVALENTS

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. A method of determining data communication characteristics of asynchronous data signals sent by a transmitting device to a receiving device comprising the steps of:

receiving a sequence of asynchronous data signals sent from the transmitting device, each signal comprising a character having binary data bits, wherein a data signal transition occurs between adjacent data bits having opposite states;

measuring an interval between succeeding data signal transitions for the sequence of data signals; determining the data rate of the received data signals from the shortest measured interval; and detecting framing errors in the data signals to determine the data format of the data signals.

2. The method of claim 1 further comprising the step of automatically configuring the receiving device with the determined data rate and data format to match the data communication characteristics of the transmitting device.

3. The method of claim 2 further comprising the step of storing the data rate and data format in a memory of the receiving device.

4. The method of claim 1 further comprising the step of detecting the electrical form and polarity of the received data signals.

5. The method of claim 1 further comprising the step of detecting parity errors in the received data signals to determine the parity of the received data signals.

6. A method of determining data communication characteristics of asynchronous data signals sent by a transmitting device to a receiving device comprising the steps of:

receiving a sequence of asynchronous data signals sent from the transmitting device, each signal comprising a character having binary data bits, wherein a data signal transition occurs between adjacent data bits having opposite states;

detecting the electrical form and polarity of the received data signals;

measuring an interval between succeeding data signal transitions for the sequence of received data signals;

determining the data rate of the received data signals from the shortest measured interval;

determining data format of the received data signals by iteratively programming a number of bits per data character until framing errors are below an error threshold; and storing data rate and data format characteristics in a memory of the receiving device and configuring the receiving device to match the data communication characteristics of the transmitting device.

7. The method of claim 6 further comprising the steps of detecting parity errors for the sequence of data in the received data signals and setting parity according to the level of parity errors detected in the sequence of data.

8. A data communication system comprising:

a transmitting device for transmitting a sequence of asynchronous data signals, each signal comprising a character having binary data bits, wherein a data signal transition occurs between adjacent data bits having opposite states;

a communication link; and a receiving device comprising:

a programmable receiver for receiving the asynchronous data signals sent from the transmitting device; and a microcontroller coupled to the receiver comprising:

means for measuring an interval between succeeding data signal transitions for the sequence of received data signals;

means for determining the data rate of the received data signals from the shortest measured interval;

means for detecting framing errors in the received data signals to determine the data format of the received data signals; and means for configuring the receiving device with the determined data rate and data format to match the data communication characteristics of the transmitting device.

9. The system of claim 8 wherein the microcontroller further comprises means for detecting parity errors in the received data signals and setting parity according to the level of parity errors detected.

10. The system of claim 8 wherein the receiving device further comprises memory for storing data rate and data format characteristics.

11. The system of claim 8 wherein the receiving device further comprises a display coupled to the microcontroller, the display being responsive to data signals from the microcontroller.

12. In a data communication system having a transmitting device and a receiving device, apparatus in the receiving device for determining data communication characteristics of asynchronous data signals sent by the transmitting device comprising:

a programmable receiver for receiving a sequence of asynchronous data signals sent from the transmitting device, each signal comprising a character having binary data bits, wherein a data signal transition occurs between adjacent data bits having opposite states; and a microcontroller coupled to the receiver comprising:

means for measuring an interval between succeeding data signal transitions for the sequence of received data signals;

means for determining the data rate of the received data signals from the shortest measured interval;

means for detecting framing errors in the received data signals to determine the data format of the received data signals; and means for configuring the receiving device with the data rate and data format to match the data communication characteristics of the transmitting device.

13. The apparatus of claim 12 further comprising a detector circuit for detecting the electrical form and polarity of the received data signals.

14. The apparatus of claim 12 further comprising memory for storing data rate and data format characteristics.

15. The apparatus of claim 12 wherein the microcontroller further comprises means for detecting parity errors in the received data signals and setting parity according to the level of parity errors detected.

16. The apparatus of claim 12 further comprising a display coupled to the micro-controller, the display being responsive to data signals from the microcontroller.

17. In a data communication system having a transmitting device and a receiving device, apparatus in the receiving device for determining data communication characteristics of asynchronous data signals sent by the transmitting device comprising:

a programmable receiver for receiving a sequence of asynchronous data signals sent from the transmitting device, each signal comprising a character having binary data bits, wherein a data signal transition occurs between adjacent data bits having opposite states;

a detector circuit for detecting the electrical form and polarity of the received data signals; and a microcontroller comprising:

means for measuring an interval between succeeding data signal transitions for the sequence of received data signals;

means for determining the data rate of the receiving data signals from the shortest measured interval;

means for determining data format by iteratively programming a number of bits per data character until framing errors are below an error threshold; and means for storing data rate and data format characteristics in a memory of the receiving device and configuring the receiving device to match the data communication characteristics of the transmitting device.

18. The apparatus of claim 17 wherein the microcontroller further comprises means for detecting parity errors in the received data signals for the sequence of data and setting parity according to the level of parity errors detected in the sequence of data.

19. The apparatus of claim 17 further comprising a display coupled to the microcontroller, the display being responsive to data signals from the microcontroller.

20. A data communication system comprising:
- a measurement device for transmitting measurement information as a sequence of asynchronous data signals, each signal comprising a character having binary data bits, wherein a data signal transition occurs between adjacent data bits having opposite states, the measurement device configured to transmit according to line settings that include a data rate of the asynchronous data signals;
- a receiving device coupled to the measurement device comprising:
- a communication analyzer for analyzing the sequence of asynchronous data signals to determine the line settings and for configuring the receiving device with the determined line settings such that the receiving device and measurement device are configured with matching line settings, the communication analyzer including:
  - means for measuring an interval between succeeding data signal transitions for the sequence of received data signals; and
  - means for determining the data rate of the received data signals from the shortest measured interval; and
- a display device coupled to the communication analyzer for visually displaying the measurement information.

21. The system of claim 20 wherein the line settings further include parity and the communication analyzer further includes means for detecting parity errors in the received data signals and setting parity according to a level of parity errors detected.

22. The system of claim 21 wherein the line settings further include data format and the communication analyzer further includes means for determining data format by iteratively programming the receiving device with a number of bits per data character until framing errors are below an error threshold.

23. A method of determining a data rate of asynchronous data signals sent by a transmitting device to a receiving device comprising the steps of:
- receiving a sequence of asynchronous data signals sent from the transmitting device, each signal comprising a character having binary data bits, wherein a data signal transition occurs between adjacent data bits having opposite states, the sequence comprising at least 50 characters;
- measuring an interval between succeeding data signal transitions for the sequence of data signals;
- determining the data rate of the received data signals from the shortest measured interval; and
- automatically configuring the receiving device with the determined data rate to match the data rate of the transmitting device.

24. The method of claim 23 further comprising the step of storing the data rate in a memory of the receiving device.

25. In a data communication system having a measurement device and a receiving device, apparatus in the receiving device for determining data communication characteristics of asynchronous data signals sent by the measurement device comprising:
- a programmable receiver for receiving a sequence of asynchronous data signals sent from the measurement device, each signal comprising a character having binary data bits, wherein a data signal transition occurs between adjacent data bits having opposite states, the sequence comprising at least 50 characters; and
- a microcontroller comprising:
  - means for measuring an interval between succeeding data signal transitions for the sequence of received data signals;
  - means for determining the data rate of the received data signals from the shortest measured interval;
  - means for determining data format by iteratively programming a number of bits per data character until framing errors are below an error threshold; and
  - means for storing data rate and data format characteristics in a memory of the receiving device and configuring the receiving device to match the data communication characteristics of the measurement device.

26. The apparatus of claim 25 wherein the microcontroller further comprises means for detecting parity errors in the received data signals for the sequence of data and setting parity according to the level of parity errors detected in the sequence of data.

* * * * *